Patented June 23, 1931

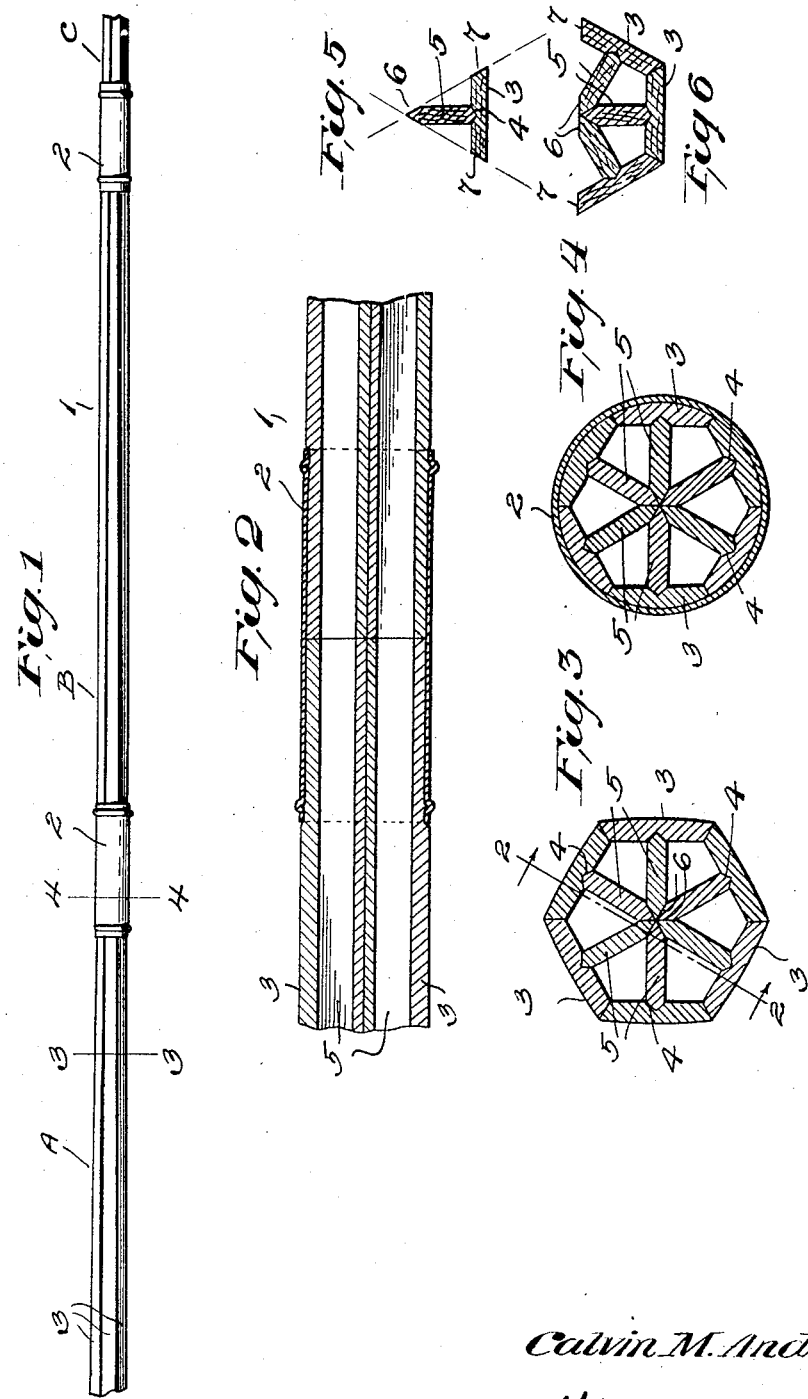

1,811,419

UNITED STATES PATENT OFFICE

CALVIN M. ANDERSON, OF COLUMBUS, OHIO

REISSUED

FISHING ROD CONSTRUCTION

Application filed May 29, 1929. Serial No. 367,027.

This invention relates to an improved fishing pole and has for its primary object the provision of a fishing pole so constructed as to be light in weight yet exceptionally strong in resisting forces or stresses tending to break the same.

It is another object of the invention to provide a rod or staff particularly designed for use as or in connection with a fishing pole and wherein said staff is formed to comprise a substantially hollow body polygonal in cross-section and made up from a plurality of joined inter-engaging strips having adhesively united meeting edges.

A further object of the invention resides in the provision of a staff or rod of the character described wherein the hollow body is braced through the medium of an improved truss frame which, in turn, consists of a plurality of strips having beveled meeting faces disposed substantially in the longitudinal axis of the rod or staff, the outer edges of the truss strips being engaged with the inner walls of the rod body in such manner as to provide maximum resistance to stresses or forces tending to transversely break the rod.

Another object of the invention resides in forming the rod including the body and truss strips thereof from bamboo which material possesses, among other advantages, the properties of being light in weight yet possessing a maximum degree of mechanical strength.

With these and other objects in view which will appear as the description proceeds, the invention consists in the novel features of construction, combinations of elements and arrangements of parts hereinafter to be fully described and pointed out in the appended claims.

In the accompanying drawings:

Figure 1 is a side elevation of a fishing rod or pole constructed in accordance with the present invention, Figure 2 is a vertical longitudinal sectional view on a somewhat enlarged scale taken through the rod at the joint between a pair of its registering sections, Figure 3 is a transverse sectional view on the line 3—3 of Figure 1, Figure 4 is a similar view on the line 4—4 of Figure 1, Figure 5 is a detail transverse sectional view showing the manner of developing one of the body and truss strips of the rod, and Figure 6 is a similar view disclosing the development of substantially one-half of the rod.

Referring more particularly to the drawings, the numeral 1 designates my improved fishing pole or rod in its entirety. As usual, the rod is composed of a plurality of sections, such as are indicated at A, B and C. Each of these sections is formed from a material such as bamboo, and while I do not limit myself specifically to the use of this particular material, yet in practice I prefer to employ it for the reason that it possesses properties admirably suited for fishing pole construction. The sections A, B and C are provided with metallic ferrules 2 by means of which the said sections may be maintained secure, as shown in Figures 1 and 2, in longitudinal alignment and is quickly removed and stored in a compact space, as is customary in fishing rod construction.

The present invention deals particularly with specific construction of each of the sections A, B and C and a description of any one of these sections will suffice for all. The section B, for example, consists of a body of hollow polygonal form. The body is composed of a plurality of bamboo strips, indicated at 3, wherein the grain of the wood runs lengthwise thereof. As shown in Figure 5, the strip 3 has its inner wall longitudinally grooved as indicated at 4 for the reception of a truss strip 5. The groove 4 is substantially V-shaped in cross-section for the reception of the similarly formed edge produced on the strip 5. The outer longitudinal edges of the strip 3 and the inner axial edges 6 of the strip 5 lie in the same planes. In fact, in process of manufacture the strip 5 is positioned so that it will extend perpendicularly to the body strip 3 and after being secured in this position the edges 6 and the corresponding outer edges 7 of the strip 3 are planed so as to be precisely uniform in angularity to occupy the same planes.

In this instance the rod has been shown as being substantially hexagonal in cross-section, although in this respect I do not limit myself to the particular configuration shown, since it is obvious that other polygonal forms may be employed with equal effectiveness.

The strips comprising the body section of the rod are similarly united with perpendicularly extending truss strips all of which have their edges 6 beveled to correspond with the angular sides 7 provided along the outer longitudinal edges of the body strips 3. The angular edges 6 of the truss strips meet in the center or the longitudinal axis of the rod or staff. To produce closely registering joining surfaces which may be adhesively united to produce a rod construction which, while exceptionally light in weight, possesses a very great degree of mechanical strength. The edge grain of the truss strips 5 is presented to the cross-grain of the body strips to fortify the latter in resisting shear stresses. The outer surfaces of the body strips may be of segmental or flat formation and in practice, since the strips are formed from bamboo, the outer surfaces of the rod are slightly curved, as shown in Figure 3. After one of the units of the rod has been formed, as shown in Figure 5, the remaining units are similarly formed and are placed together, as shown in Figure 6, to produce one-half of the rod. The other half is then applied and the units adhesively united to produce the cross-sectional formation disclosed particularly in Figures 3 and 4.

In view of the foregoing it will be seen that the present invention provides a fishing rod of lightness, strength and flexibility and one wherein surplus weight has been removed to a maximum degree without sacrificing strength and other desired factors.

What is claimed is:

1. A fishing rod consisting of a hollow body composed of longitudinally extending strips of bamboo, said strips being adhesively united along their longitudinal meeting edges, and a plurality of truss strips arranged within said body and extending perpendicularly to said body strips, said truss strips being interengaged along the longitudinal axis of said rod.

2. A fishing rod comprising a hollow body consisting of a plurality of longitudinally extending strips united relatively along their longitudinally extending meeting edges, and a plurality of truss strips extending perpendicularly from each of said body strips and engaging with each other along the longitudinal axis of said rod.

3. A fishing rod comprising a hollow body consisting of a plurality of longitudinally extending bamboo strips, said strips being united relatively along their longitudinal edges, the inner surface of each of said strips being provided centrally with longitudinally extending grooves, and a plurality of truss strips arranged within said body and having their outer longitudinal edges positioned within said grooves, the inner edges of said strips being beveled to terminate in joining relationship in the longitudinal axis of said rod.

4. A fishing rod comprising a hollow body composed of a plurality of bamboo strips with the grain thereof running longitudinally, said strips being relatively united along their longitudinal meeting edges, and a plurality of truss strips arranged within said body and engaging with each of said body strips, said strips being perpendicularly disposed with respect to the body strips so that the edge grain of the truss strips is presented to the cross grain of the body strips.

5. A fishing rod comprising a hollow body consisting of a plurality of longitudinally extending bamboo strips, said strips being united relatively along their longitudinal edges, and a plurality of truss strips arranged within said body with their outer edges extending perpendicularly from each of said bamboo strips and arranged diametrically opposite one another, the inner edges of said truss strips being bevelled to terminate in joining relationship in the longitudinal axis of said rod.

6. A fishing rod comprising a hollow body consisting of a plurality of substantially T-shaped sections joined to one another so that the base ends thereof engage each other in the longitudinal axis of said rod.

In testimony whereof I affix my signature.

CALVIN M. ANDERSON.